(12) United States Patent
Tajima et al.

(10) Patent No.: US 11,492,939 B2
(45) Date of Patent: Nov. 8, 2022

(54) EXHAUST DEVICE AND VEHICLE FOR TRAVEL ON UNEVEN TERRAINS

(71) Applicant: KAWASAKI MOTORS, LTD., Akashi (JP)

(72) Inventors: Atsushi Tajima, Akashi (JP); Yoshihiko Orihashi, Kobe (JP)

(73) Assignee: KAWASAKI MOTORS, LTD., Akashi (JP)

( * ) Notice: Subject to any disclaimer, the term of this patent is extended or adjusted under 35 U.S.C. 154(b) by 203 days.

(21) Appl. No.: 16/986,337

(22) Filed: Aug. 6, 2020

(65) Prior Publication Data
US 2022/0042434 A1    Feb. 10, 2022

(51) Int. Cl.
| | |
|---|---|
| *F01N 3/05* | (2006.01) |
| *B60K 17/04* | (2006.01) |
| *F01N 11/00* | (2006.01) |
| *B60R 13/08* | (2006.01) |
| *F16H 9/18* | (2006.01) |
| *F16H 57/04* | (2010.01) |
| *F16H 55/56* | (2006.01) |
| *B60K 5/00* | (2006.01) |
| *F01N 13/18* | (2010.01) |

(52) U.S. Cl.
CPC ............... *F01N 3/055* (2013.01); *B60K 5/00* (2013.01); *B60K 17/04* (2013.01); *B60R 13/0876* (2013.01); *F01N 11/00* (2013.01); *F01N 13/1811* (2013.01); *F16H 9/18* (2013.01); *F16H 55/56* (2013.01); *F16H 57/0416* (2013.01); *F16H 57/0489* (2013.01); *F01N 2260/022* (2013.01)

(58) Field of Classification Search
CPC ...... F01N 3/055; F01N 11/00; F01N 13/1811; F01N 2260/022; B60K 5/00; B60K 17/04; B60R 13/0876; F16H 9/18; F16H 55/56; F16H 57/0416; F16H 57/0489
See application file for complete search history.

(56) References Cited

U.S. PATENT DOCUMENTS

| 6,863,154 B2 | 3/2005 | Uegane et al. | |
|---|---|---|---|
| 2004/0129482 A1* | 7/2004 | Takenaka | B62K 19/30 180/309 |
| 2014/0237994 A1 | 8/2014 | Takagi | |

FOREIGN PATENT DOCUMENTS

FR    2357732 A  *  3/1978  .......... F01N 13/1811

* cited by examiner

*Primary Examiner* — Audrey B. Walter
(74) *Attorney, Agent, or Firm* — Xsensus LLP

(57) ABSTRACT

An exhaust device incorporated in a vehicle for travel on uneven terrains. The exhaust device includes an air blowing device and an exhaust pipe through which exhaust gas generated in a prime mover is directed out of the vehicle. The exhaust pipe includes an upstream pipe, a downstream pipe, and a joint device joining the upstream pipe to the downstream pipe in a manner permitting the upstream pipe to move relative to the downstream pipe, the air blowing device being disposed to blow cooling air toward the joint device.

19 Claims, 10 Drawing Sheets

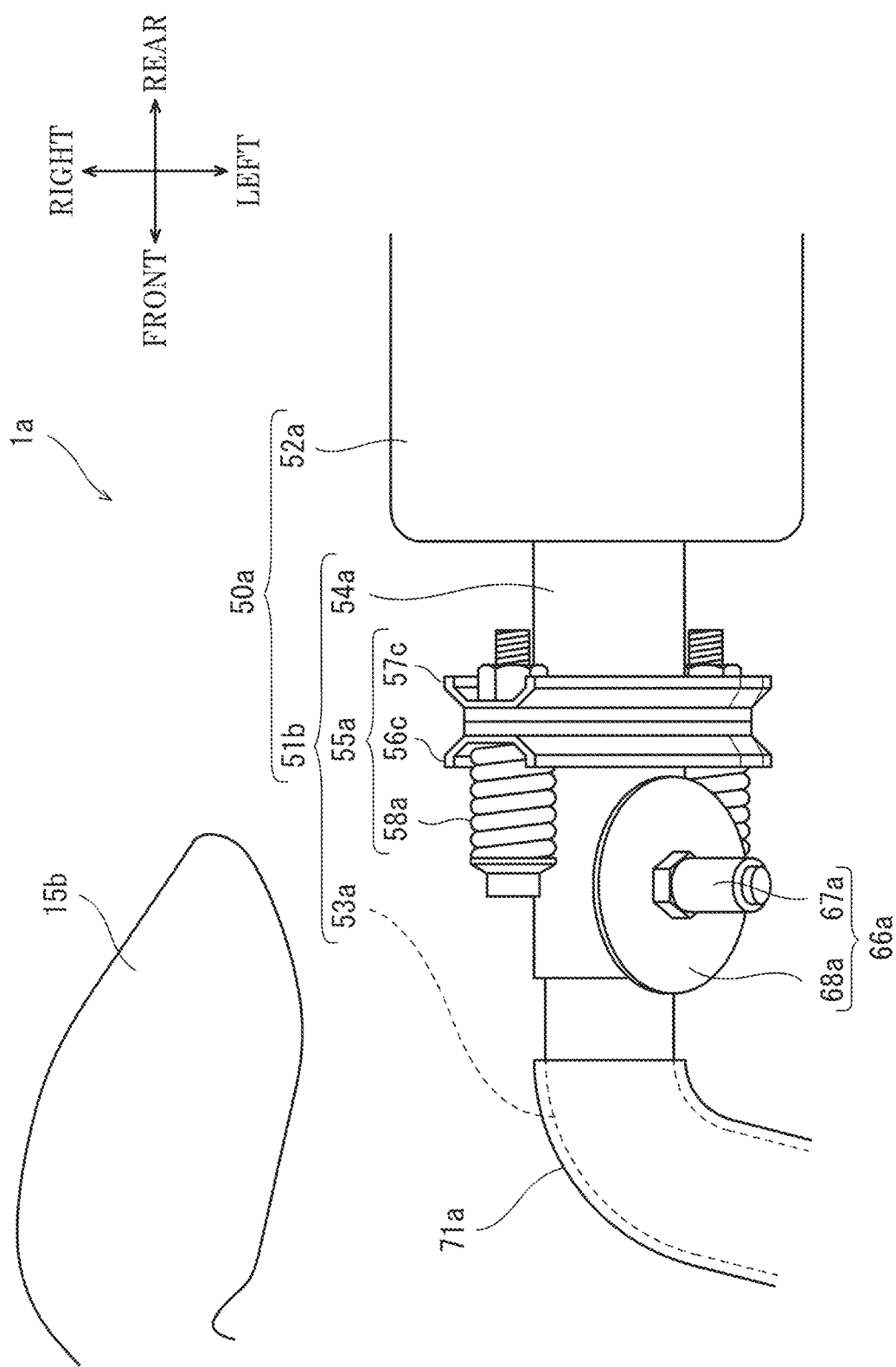

EXHAUST DEVICE AND VEHICLE FOR TRAVEL ON UNEVEN TERRAINS

BACKGROUND OF THE INVENTION

1. Field of the Invention

The present disclosure relates to an exhaust device for a vehicle for travel on uneven terrains, the exhaust device being configured to discharge exhaust gas generated in a prime mover of the vehicle to the outside of the vehicle.

2. Description of the Related Art

A vehicle for travel on uneven terrains may have high durability because when traveling on an uneven terrain, the vehicle is subjected to strong vibration due to contact with the ground surface. In particular, the exhaust pipe of such a vehicle is subjected to vibration generated in the engine and vibration due to contact with the ground surface and is thus repeatedly exposed to a great bending stress. When the vehicle for travel on uneven terrains is traveling in a normal state, the cycle of intake, compression, explosion, combustion, and exhaust is repeated in the engine, and this repetition causes pressure variation leading to vibration of the engine. Further, when the vehicle is traveling, an upward/downward inertial force arising from the irregularities of the surface with which the tires are in contact is applied to the vehicle body through the tires. In general, the exhaust pipe of the vehicle for travel uneven terrains is mounted to extend in the front-rear direction of the vehicle body, and thus the inertial force acts in such a direction as to bend the exhaust pipe. In particular, when the vehicle for travel uneven terrains is traveling on an uneven terrain, the inertial force acting on the exhaust pipe is strong because of the large irregularities of the ground surface. Examples of the vehicle for travel uneven terrains include a utility vehicle (UV) and an all terrain vehicle (ATV).

U.S. Pat. No. 6,863,154, which is incorporated by reference, discloses a configuration in which a device for vibration absorption is provided for an exhaust pipe in order to improve the durability of the exhaust pipe. However, heat transfer from the hot exhaust pipe to the device for vibration absorption may increase the temperature of the device, thus resulting in the durability of the device being reduced.

SUMMARY OF THE INVENTION

An exhaust device according to one aspect of the present disclosure is an exhaust device incorporated in a vehicle for travel on uneven terrains, the exhaust device including: an air blowing device; and an exhaust pipe through which exhaust gas generated in a prime mover is directed out of the vehicle, the exhaust pipe including an upstream pipe, a downstream pipe, and a joint device joining the upstream pipe to the downstream pipe in a manner permitting the upstream pipe to move relative to the downstream pipe, the air blowing device being disposed to blow cooling air toward the joint device.

In the above configuration, the joint device permits the upstream and downstream pipes of the exhaust pipe to move relative to each other when the exhaust pipe is exposed to an impact arising from travel on an uneven terrain and vibration of the prime mover. This can prevent stress concentration on the point where the exhaust pipe is supported. Additionally, cooling air blown out of the air blowing device is delivered toward the joint device to cool the joint device. Thus, the joint device can be prevented from becoming hot. As such, the decrease in durability of the joint device due to temperature increase can be reduced. Consequently, the durability of the exhaust device can be improved.

Further features and advantages of the present disclosure will be more apparent from the following detailed description of preferred embodiments with reference to the accompanying drawings.

BRIEF DESCRIPTION OF THE DRAWINGS

FIG. 10 is a plan view of key components of a utility vehicle according to Embodiment 2.

DETAILED DESCRIPTION OF THE EMBODIMENTS

Hereinafter, embodiments will be described with reference to the drawings.

Embodiment 1

Figure 1:
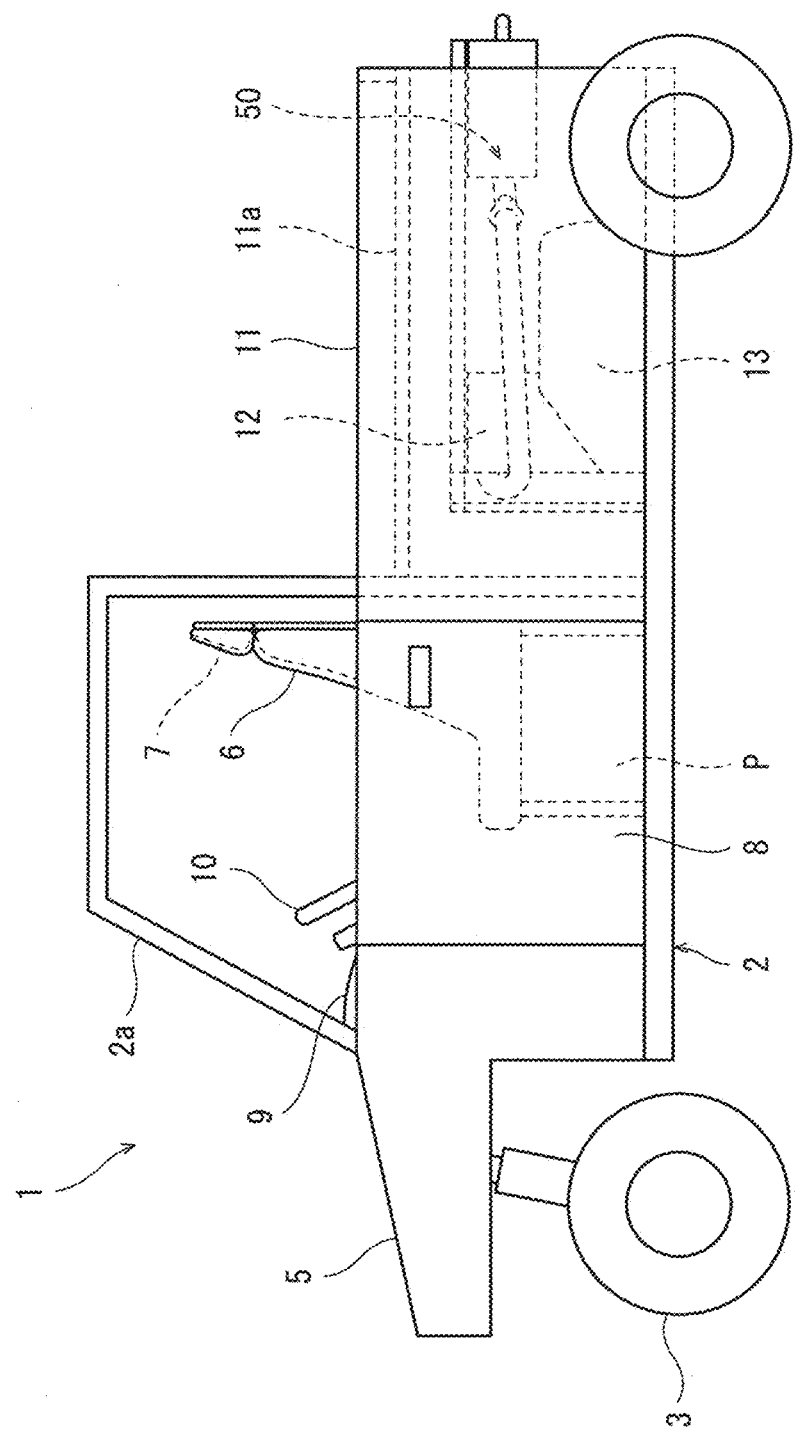
FIG. 1 is a side view of a utility vehicle according to Embodiment 1.

In the embodiments presented herein, the vehicle for travel on uneven terrains is embodied as a utility vehicle. The following describes examples in which the invention is applied to a utility vehicle. FIG. 1 is a left side view schematically showing a utility vehicle 1 according to Embodiment 1. As shown in FIG. 1, the utility vehicle 1 includes a vehicle body frame 2, a pair of left and right front wheels 3 supporting a front portion of the vehicle body frame 2, and a pair of left and right rear wheels 4 supporting a rear portion of the vehicle body frame 2. The space between the left and right front wheels 3 is covered from above by a hood 5 made of resin. A driver seat 6 and a passenger seat 7 supported by the vehicle body frame 2 are disposed rearwardly of the hood 5, and these seats are arranged side by side. In the present specification, the upward, downward, leftward, rightward, forward, and rearward directions are defined based on the viewpoint of an occupant (driver) of the vehicle who sits on the driver seat 6 or the passenger seat 7.

The vehicle body frame 2 is a pipe frame including a plurality of pipes connected together. The vehicle body frame 2 includes a cabin frame 2a surrounding the interior space in which the driver seat 6 and the passenger seat 7 are disposed. On the left of the driver seat 6 there is provided a driver seat-side boarding opening P closable by a side door 8. Likewise, a passenger seat-side boarding opening closable by a side door is provided on the right of the passenger seat 7. The interior space surrounded by the cabin frame 2a is exposed to the outside environment. A dash panel 9 is disposed forwardly of the driver seat 6 and the passenger seat 7. A handle device 10 is mounted on the dash panel 9 and projects toward the driver seat 6.

A cargo bed 11 is disposed rearwardly of the cabin frame 2a. The cargo bed 11 forms a recessed load-carrying space open to the outside environment. A cargo bed frame 11a defining the accommodation space of the cargo bed 11 is mounted at the bottom of the accommodation space. Beneath the cargo bed 11 are mounted an engine 12, a belt continuously variable transmission 13, and an exhaust device 50. The engine 12 outputs rotational power for driving the drive wheels. When the utility vehicle 1 is a two-wheel-drive vehicle, the rear wheels 4 are the drive wheels. When the utility vehicle 1 is a four-wheel-drive vehicle, the front wheels 3 and the rear wheels 4 are the drive wheels. The belt continuously variable transmission 13 changes the speed of rotation produced by rotational power output from the engine 12 and transmitted to the drive wheels. The exhaust device 50 discharges exhaust gas from the engine 12 to the outside of the utility vehicle 1.

While in the present embodiment only the engine 12 is used as a prime mover that generates drive power for driving the drive wheels, the vehicle of the present disclosure is not limited to this configuration. For example, the utility vehicle may be a vehicle whose drive wheels are driven by both rotational power of the engine and rotational power of an electric motor. In this case, when the engine is running, exhaust gas from the engine is discharged to the outside of the utility vehicle by the exhaust device.

Figure 2:
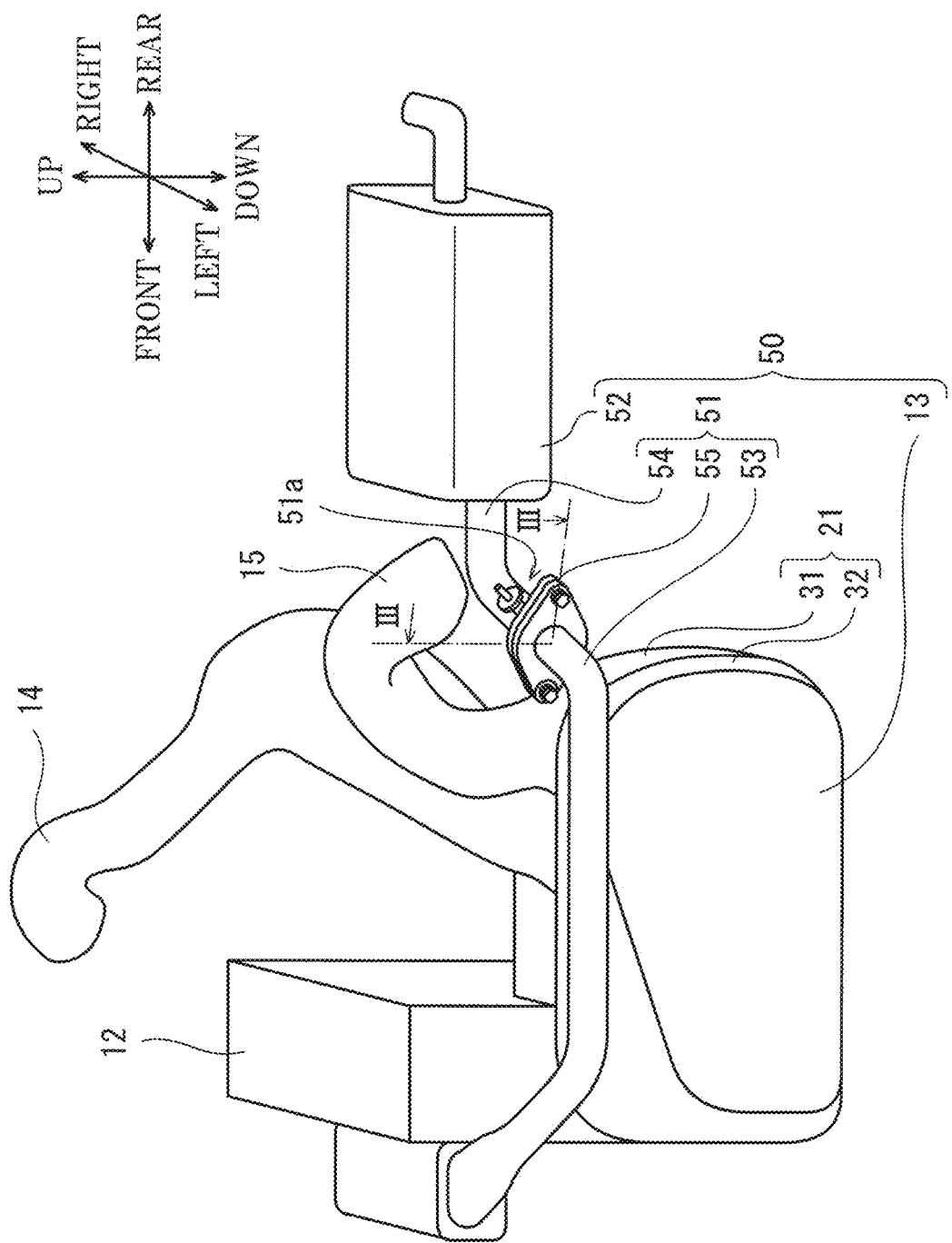
FIG. 2 is a perspective view showing an engine, a belt continuously variable transmission, and an exhaust device of the utility vehicle of FIG. 1.

FIG. 2 is a left rear perspective view of the engine 12, the belt continuously variable transmission 13, and key components of the exhaust device 50 in the utility vehicle 1 of FIG. 1. As shown in FIG. 2, the exhaust device 50 includes the belt continuously variable transmission 13, an exhaust pipe 51, and an exhaust muffler 52. The exhaust pipe 51 is connected to the front end (gas discharge side) of the engine 12 and directs exhaust gas generated in the engine 12 toward the outside of the vehicle. The exhaust muffler 52 allows the exhaust gas to pass therethrough, thus reducing noise produced from combustion in the engine 12. In the present embodiment, a catalyst is placed inside the exhaust muffler 52. When the exhaust gas is passing through the exhaust muffler 52, the exhaust gas contacts the catalyst, and thus hazardous substances such as HC, CO, and $NO_x$ contained in the exhaust gas can be removed. While in the present embodiment the catalyst is placed inside the exhaust muffler 52, the vehicle of the present disclosure is not limited to this configuration of the present embodiment. The catalyst may be disposed inside the exhaust pipe 51 rather than inside the exhaust muffler 52. The catalyst may be disposed at any location where the catalyst can contact the exhaust gas to remove hazardous substances contained in the exhaust gas.

The belt continuously variable transmission 13 includes a housing 21. To the housing 21 of the belt continuously variable transmission 13 are connected an air inlet duct 14 and an air outlet duct 15. The housing 21 includes a housing body 31 and a cover 32. The housing body 31 has an opening facing laterally and is secured to the engine 12. The cover 32 is removably mounted on the housing body 31 to close the opening of the housing body 31.

The exhaust pipe 51 includes an upstream pipe 53, a downstream pipe 54, and a joint device 55. The joint device 55 joins the upstream pipe 53 to the downstream pipe 54 in a manner permitting the upstream pipe 53 to move relative to the downstream pipe 54 on a plane perpendicular to the axial direction of the pipes.

Figure 3:
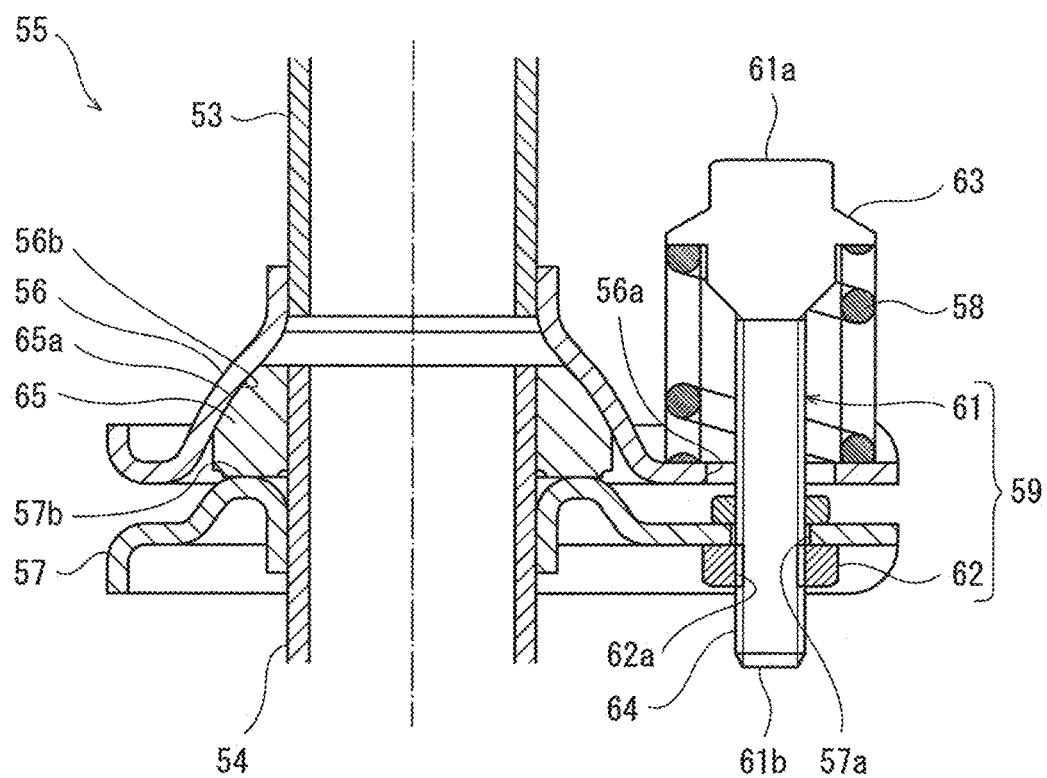
FIG. 3 is a cross-sectional view of a joint device joining upstream and downstream pipes of an exhaust pipe of the exhaust device of FIG. 2.

The joint device 55 will be described with reference to FIG. 3. FIG. 3 is a cross-sectional view of the joint device 55 shown in FIG. 2 taken along line III-III. The joint device 55 includes a first flange 56, a second flange 57, an elastic element 58, an elastic element holding member or holder 59, and a slide member or slide 65. The first flange 56 is attached to an end of the upstream pipe 53 facing the downstream pipe 54. For example, the first flange 56 is joined to the upstream pipe 53 by welding. The second flange 57 is attached to an end of the downstream pipe 54 facing the upstream pipe 53. For example, the second flange 57 is joined to the downstream pipe 54 by welding.

The elastic element holding member 59 includes a body portion 61 or bolt and a nut portion 62. The body portion 61 includes an increased-diameter portion 63 or head located in the vicinity of one longitudinal end 61a of the body portion 61 and projecting radially outward. The body portion 61 is provided with a thread groove 64 in the vicinity of the other longitudinal end 61b. The nut portion 62 is fastened to the body portion 61 in the vicinity of the other end 61b of the body portion 61 by engagement of a thread ridge 62a with the thread groove 64. The elastic element 58 is located radially outward of the body portion 61 and held between the first flange 56 and the increased-diameter portion 63 in the longitudinal direction of the body portion 61. The first and second flanges 56 and 57 are respectively provided with through holes 56a and 57a each extending through the thickness of the corresponding flange. The body portion 61 extends through the through hole 56a of the first flange 56 and the through hole 57a of the second flange 57, and is fastened to the nut portion 62 at a location opposite to the location of the first flange 56 with respect to the second flange 57. The elastic element 58 biases the first flange 56 toward the second flange 57. Additionally, the increased-diameter portion 63 is pressed toward the upstream pipe by the biasing force of the elastic element 58, and thus the body portion 61 is pressed by the biasing force of the elastic element 58 in a direction from the second flange 57 toward the first flange 56. As such, the nut portion 62 fastened to the body portion 61 is pulled toward the first flange 56 while in contact with the second flange 57, and presses the second flange 57 toward the first flange 56. In this manner, the elastic element 58 elastically biases the first and second flanges 56 and 57 in such a direction that the first and second flanges 56 and 57 are close to each other.

The slide member 65 is located in the vicinity of the upstream pipe-facing end of the downstream pipe 54 in the direction in which the exhaust pipe 51 extends. The slide member 65 is disposed radially outward of the downstream pipe and held between the first and second flanges 56 and 57 in the direction in which the exhaust pipe 51 extends. The slide member 65 has an outer surface with a curved portion 65a. The first flange 56 has a portion 56b that is in contact with the slide member 65, and the portion 56b is curved to have a gently concave surface. The second flange 57 has a portion 57b that is in contact with the slide member 65, and the portion 57b is curved. That is, the outer surface of the slide member 65 has the curved portion 65a, and the first and second flanges 56 and 57 are curved at locations where these flanges are in contact with the slide member 65. Thus, the first and second flanges 56 and 57 can move smoothly by sliding against the slide member 65. As such, the joint device 55 joins the upstream pipe 53 to the downstream pipe 54 in a manner permitting the upstream pipe 53 to smoothly move relative to the downstream pipe 54. In addition or alternatively to the illustrated joint device 55, the joint device may be implemented as disclosed in JP 2004-108270 A and JP 2005-320907 A, both of which are incorporated by reference.

When the exhaust pipe 51 is exposed to an impact arising from travel on an uneven terrain and vibration of the engine 12, the first and second flanges 56 and 57 slide against the slide member 65 in the joint device 55, thus permitting the upstream and downstream pipes 53 and 54 of the exhaust pipe 51 to smoothly move relative to each other. This can prevent stress concentration on the exhaust pipe 51 and the point where the exhaust pipe 51 is supported. In particular, even when the vehicle body frame 2 and the exhaust pipe 51 are subjected to vibrations in opposite phases and thereby largely moved relative to each other to cause a significant relative movement between the upstream and downstream pipes 53 and 54, the joint device 55 can absorb the relative movement to prevent stress concentration on the point where the exhaust pipe 51 is supported.

In the present embodiment, the joint device 55 of the exhaust pipe 51 is disposed close to the exhaust muffler 52 (FIG. 2). In general, an exhaust pipe is long, and an exhaust muffler which is heavy is mounted in the vicinity of the outlet end of the exhaust pipe. For this reason, the stress acting on the exhaust pipe is concentrated on a point close to the exhaust muffler. Thus, in the exhaust pipe, stress mitigation is preferably effected at the point close to the exhaust muffler. This is why in the exhaust pipe 51 of the present embodiment the joint device 55 is disposed close to the exhaust muffler 52.

The temperature of exhaust gas flowing through the exhaust pipe 51 increases with decreasing distance from the engine 12. Thus, the smaller the distance from the engine 12 is, the higher the temperature of the exhaust pipe 51 is. In the present embodiment, the joint device 55 of the exhaust pipe 51 is disposed at a location which is distant from the engine 12 and at which the temperature of the exhaust pipe 51 is relatively low. This can reduce exposure of the joint device 55 to high temperature, resulting in improved durability of the joint device 55. Thus, disposing the joint device 55 of the exhaust pipe 51 at a location close to the exhaust muffler 52 is preferred also for thermal reasons.

The joint device 55 is located rearwardly of the engine 12 in the vehicle front-rear direction. Since the joint device 55 is located rearwardly of the engine 12 and is therefore not situated just above the engine 12, direct heat transfer from the engine 12 to the joint device 55 can be reduced. Thus, exposure of the joint device 55 to high temperature can be reduced.

In the present embodiment, the exhaust pipe 51 includes a width direction extending portion 51a extending in the vehicle width direction, and the first and second flanges 56 and 57 of the joint device are coupled at the width direction extending portion 51a. Thus, the first and second flanges 56 and 57 are disposed to extend in the vehicle front-rear direction. If the joint device is mounted on a portion of the exhaust pipe that extends in the vehicle front-rear direction, the space for mounting of the joint device will be long in the vehicle width direction due to the inclusion of the springs at both ends of the joint device, and the vehicle will need to have a large space in the vehicle width direction. As can be seen from FIG. 2, the joint device is mounted on a portion of the exhaust pipe that extends in the vehicle width direction (referred to as "width direction extending portion 51a"). The joint device is placed in a position where its extended portions for mounting of the springs are arranged in the vehicle front-rear direction. This can reduce the dimension of the joint device 55 in the vehicle width direction and reduce the space occupied by the joint device 55 in the vehicle width direction.

Figure 4:
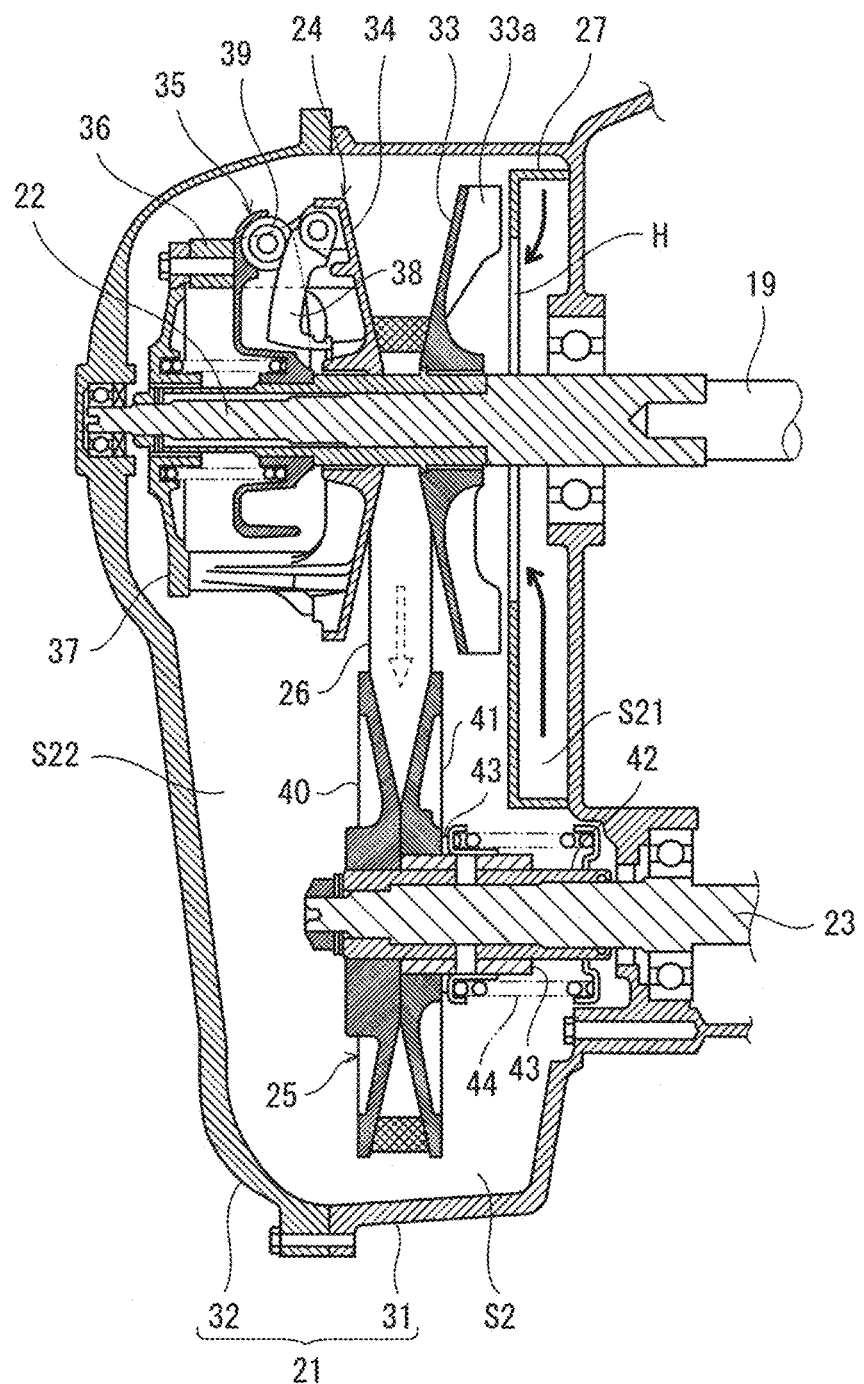
FIG. 4 is a horizontal cross-sectional view of the belt continuously variable transmission of FIG. 2.

FIG. 4 is a horizontal cross-sectional view of the belt continuously variable transmission 13 shown in FIG. 2. As shown in FIG. 4, the belt continuously variable transmission 13 includes: an input shaft 22 connected to a crankshaft 19 of the engine 12 to receive rotational power from the engine 12; and an output shaft 23 that outputs rotational power toward the drive wheels (toward the propeller shaft).

A drive pulley 24 is mounted on the input shaft 22, and a driven pulley 25 is mounted on the output shaft 23. A V-shaped belt 26 is wound around the drive pulley 24 and the driven pulley 25. The drive pulley 24 includes a stationary sheave 33 secured to the input shaft 22, a movable sheave 34 fitted on the input shaft 22 so as to be movable in the axial direction of the input shaft 22, and a sheave thrust force generating mechanism 35 (e.g., a flyweight mechanism). The belt 26 is held between circular conical holding surfaces formed by the stationary sheave 33 and movable sheave 34. As the movable sheave 34 moves along the input shaft 22 to change the distance from the stationary sheave 33, the radial location where the belt 26 is held (i.e., the effective diameter of the drive pulley 24) changes.

A backing plate 37 is coupled to the back surface of the movable sheave 34 via a plurality of coupling arms 36 extending outwardly. The backing plate 37 is movable in the axial direction of the input shaft 22 together with the movable sheave 34. The sheave thrust force generating mechanism 35 is disposed between the movable sheave 34 and the backing plate 37. In the sheave thrust force generating mechanism 35, a plurality of flyweights 38 pivot away from the movable sheave 34 under the action of centrifugal force to press a pressure-receiving roller 39, and the reaction force against the pressing force causes the movable sheave 34 to move closer to the stationary sheave 33. That is, the sheave thrust force generating mechanism 35 uses the centrifugal force of the rotation of the drive pulley 24 to generate a thrust force acting to reduce the distance between the stationary sheave 33 and the movable sheave 34. On the back surface of the stationary sheave 33 is provided an impeller 33a which generates a swirling flow.

The driven pulley 25 includes a stationary sheave 40 secured to the output shaft 23 and a movable sheave 41 fitted on the output shaft 23 so as to be movable in the axial direction of the output shaft 23. For example, a hollow camshaft 42 with a plurality of spiral cam grooves is secured to the outer circumferential surface of the output shaft 23, and the hollow camshaft 42 and stationary sheave 40 corotate with the output shaft 23. A sleeve 43 is integrally coupled to the inner periphery of the movable sheave 41. The sleeve 43 is fitted on the outer circumferential surface of the hollow camshaft 42 so as to be movable in the axial direction of the hollow camshaft 42. The sleeve 43 supports a roller (not shown) movable along the cam grooves of the hollow camshaft 42.

The sleeve 43 is biased by a pressure-adjusting spring 44 toward the stationary sheave 40, and the movable sheave 41 is pressed toward the stationary sheave 40. Once the movable sheave 41 is subjected to a rotational force due to the tension of the belt 26, a cam action exerted by the hollow camshaft 42 and the roller generates a thrust force acting to bring the movable sheave 41 closer to the stationary sheave 40.

When the input shaft 22 is rotating at a low speed, the effective diameter of the drive pulley 24 is small and the effective diameter of the driven pulley 25 is large (the reduction ratio is high). Upon an increase in the rotational speed of the input shaft 22, the increased centrifugal force allows the sheave thrust force generating mechanism 35 to generate a thrust force, by which the movable sheave 34 is moved closer to the stationary sheave 33, thus increasing the effective diameter of the drive pulley 24. Meanwhile, in the driven pulley 25, the tension of the belt 26 and hence the radially inward force applied by the belt 26 are increased, and the movable sheave 41 is moved away from the stationary sheave 40 against the spring force of the pressure-adjusting spring 44 and the cam thrust force of the hollow camshaft 42, thus decreasing the effective diameter of the driven pulley 25.

The interior of the housing 21 includes a dividing wall 27 dividing an accommodation space S2 into a first flow passage S21 and a second flow passage S22. The first flow passage S21 communicates with an air inlet passage S1 of the air inlet duct 14 (see FIG. 2). In the second flow passage S22, the drive pulley 24, the driven pulley 25, the belt 26, and other components are disposed. The second flow passage S22 communicates with an air outlet passage S3 of the air outlet duct 15 (see FIG. 2). The dividing wall 27 has a portion facing the impeller 33a of the stationary sheave 33 of the drive pulley 24. The dividing wall 27 is provided with an opening H facing a radially inner portion of the impeller 33a of the stationary sheave 33.

Figure 5:
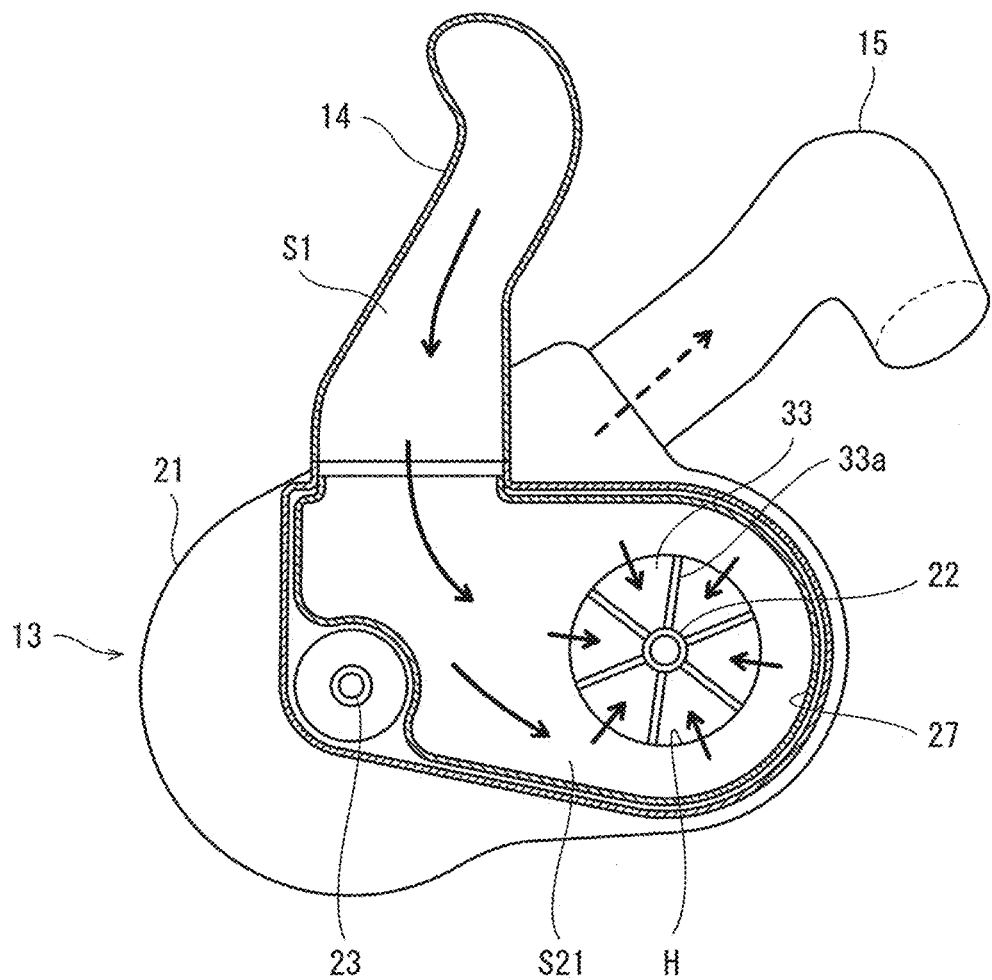
FIG. 5 is a vertical cross-sectional view of the belt continuously variable transmission of FIG. 4 as seen from one side in the vehicle width direction.

FIG. 5 is a vertical cross-sectional view of the belt continuously variable transmission 13 of FIG. 4 as seen from one side in the vehicle width direction. As shown in FIG. 5, when the stationary sheave 33 is rotating, the impeller 33a generates a swirling flow moving radially outward, and thus air in the first flow passage S21 is drawn toward the radially inner portion of the impeller 33a through the opening H (black arrows in FIG. 5). By the action of the resulting negative pressure, air is delivered from the air inlet passage S1 of the air inlet duct 14 to the first flow passage S21 of the belt continuously variable transmission 13.

Figure 6:
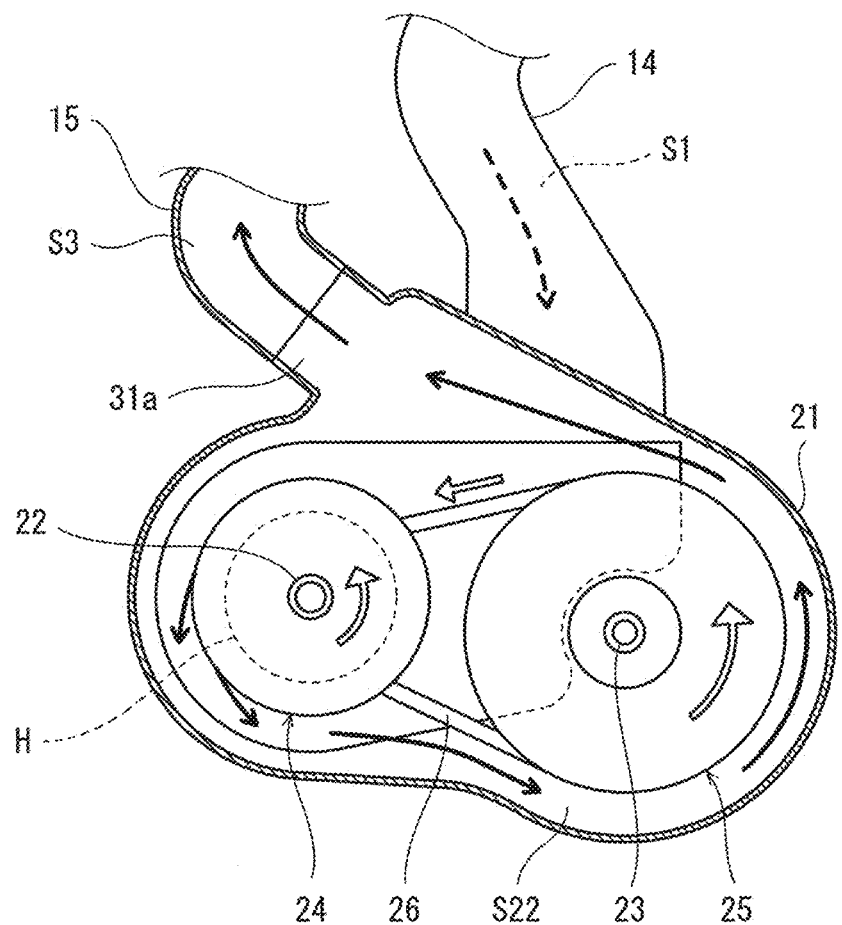
FIG. 6 is a vertical cross-sectional view of the belt continuously variable transmission of FIG. 4 as seen from the other side in the vehicle width direction.
Figure 6:
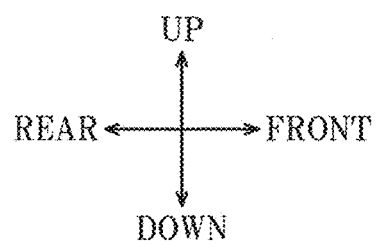

FIG. 6 is a vertical cross-sectional view of the belt continuously variable transmission 13 of FIG. 4 as seen from the other side in the vehicle width direction. As shown in FIG. 6, when the drive pulley 24 is rotating, air flowing into the second flow passage S22 from the first flow passage S21 through the opening H is directed radially outward by the impeller 33a (see FIG. 4) of the stationary sheave 33 of the drive pulley 24. In the second flow passage S22, the rotation of the drive and driven pulleys 24 and 25 (white arrows in FIG. 6) produces a stream of air flowing along the inner peripheral surface of the housing 21 in the same direction as the belt 26 rotates (black arrows in FIG. 6).

The belt 26 is heated as a result of receiving torque from the drive pulley 24 and transmitting the torque to the driven pulley 25. The belt 26 can be cooled by the stream of air flowing along the inner peripheral surface of the housing 21. The air in the second flow passage S22, which flows along the inner peripheral surface of the housing 21 when viewed in the axial direction of the shafts, exchanges heat with the belt 26 to cool the belt 26.

The inner peripheral surface of the housing 21 in the second flow passage S22, as viewed in the axial direction of the shafts, is provided with an outlet duct entrance 31a communicating with the air outlet passage S3 of the air outlet duct 15. The air passing through the second flow passage S22 is delivered to the air outlet passage S3 through the outlet duct entrance 31a and discharged out of the belt continuously variable transmission 13 through the air outlet duct 15. In the present embodiment, the air outlet duct 15 is connected to an end of the upper wall of the housing body 31. The exit of the air inlet duct 14 and the entrance of the air outlet duct 15, as viewed in the axial direction of the shafts, are away from each other.

The belt continuously variable transmission 13 functions as an air blowing device or air blower that performs air blowing by discharging air through the air outlet duct 15. In the present embodiment, the belt continuously variable transmission 13 is disposed such that air blown out of the air outlet duct 15 is delivered toward the joint device 55. When the belt continuously variable transmission 13 performs air blowing, the stationary sheave 33 of the drive pulley 24 rotates, and accordingly the impeller 33a rotates, so that air is blown out of the air outlet duct 15. An increase in the rotational speed of the crankshaft 19 of the engine 12 accelerates the rotation of the impeller 33a, thereby providing an increase in the amount of air blown out of the air outlet duct 15. That is, the amount of air blown out of the air outlet duct 15 is proportional to the rotational speed of the crankshaft 19 of the engine 12. Thus, when the rotational speed of the crankshaft 19 of the engine 12 increases and accordingly the temperature of exhaust gas flowing through the exhaust pipe 51 rises to increase the temperature of the joint device 55, the joint device 55 is cooled by an amount of air blown as a function of the rotational speed of the crankshaft 19. As such, the joint device 55 can be cooled by air blown in an amount appropriate for the temperature increase of the joint device 55, and efficient cooling of the joint device 55 can be achieved.

In the present embodiment, an outlet opening 15a through which air is discharged from the air outlet duct 15 is disposed above the joint device 55 in the vehicle height direction. The air outlet duct 15 blows air from the outlet opening 15a located above the joint device 55 toward the joint device 55 located below the outlet opening 15a. That is, the outlet opening 15a of the air outlet duct 15 faces downwardly. Since the outlet opening 15a faces downwardly, foreign matter such as rainwater can be prevented from entering the air outlet duct 15 from above through the outlet opening 15a. Thus, foreign matter such as rainwater can be prevented from entering the belt continuously variable transmission 13 through the air outlet duct 15. This can improve the reliability of the belt continuously variable transmission 13.

In the present embodiment, the inlet opening through which air is drawn into the air inlet duct 14 also faces downwardly just as does the outlet opening of the air outlet duct 15. Since the inlet opening faces downwardly, foreign matter such as rainwater can be prevented from entering the air inlet duct 14 from above through the inlet opening. Thus, foreign matter such as rainwater can be prevented from entering the belt continuously variable transmission 13 through the air inlet duct 14.

Figure 7:
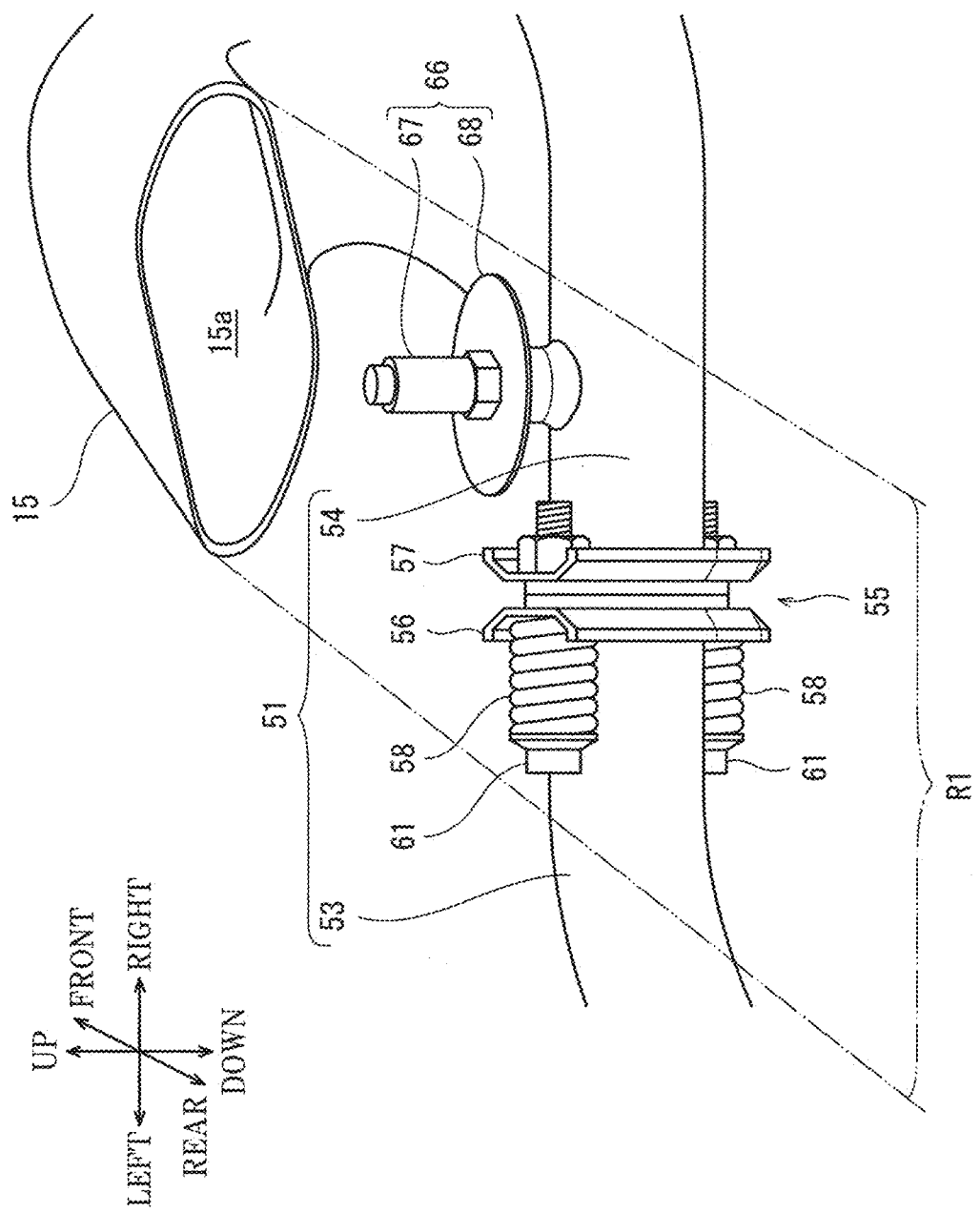
FIG. 7 is an enlarged perspective view of an air outlet duct of the belt continuously variable transmission, a sensor, and the joint device which are shown in FIG. 2.

FIG. 7 is an enlarged rear perspective view of the outlet opening 15a of the air outlet duct 15 of the belt continuously variable transmission 13 and the joint device 55. As shown in FIG. 7, the exhaust pipe 51 is equipped with a sensor 66. The sensor 66 includes a detection portion which, as described later, is disposed inside the exhaust pipe 51. Thus, when exhaust gas from the engine 12 is flowing through the exhaust pipe 51, the exhaust gas contacts the detection portion, so that the sensor 66 can sense the exhaust gas. In the present embodiment, the sensor 66 is mounted on the downstream pipe 54 and in the vicinity of the joint device 55. In the direction of flow of the exhaust gas through the exhaust pipe 51, the joint device 55 may be disposed at an upstream location, and the sensor 66 may be disposed at a downstream location, and vice versa. In the present embodiment, the joint device 55 is disposed at an upstream location and the sensor 66 is disposed at a downstream location in the direction of flow of the exhaust gas through the exhaust pipe 51.

In the present embodiment, an $O_2$ sensor, for example, is used as the sensor 66. The $O_2$ concentration in the exhaust gas can be measured by the $O_2$ sensor. The measurement of the $O_2$ concentration in the exhaust gas makes it possible, during combustion in the combustion chamber of the engine 12, to regulate the amount of fuel injection based on the measured $O_2$ concentration to allow the combustion to proceed at a desired air-fuel ratio. This can reduce the amounts of substances such as HC, CO, and $NO_x$ which are generated during the combustion. Additionally, feeding just a necessary amount of fuel during the combustion leads to reduction in fuel consumption and hence improvement in fuel economy.

In the present embodiment, the sensor 66 includes a sensor body 67 having a circular cylindrical shape and extending longitudinally in a direction; a circular disc-shaped radiator plate 68; and the detection portion (not shown) in charge of detection. The sensor 66 is mounted on the exhaust pipe 51 with the sensor body 67 penetrating the wall surface of the exhaust pipe 51 so that the detection portion is located inside the exhaust pipe 51. In the present embodiment, the sensor 66 is mounted on the exhaust pipe 51 in such a manner that the direction in which the sensor body 67 extends is perpendicular to the direction of flow of the exhaust gas through the exhaust pipe 51. The radiator plate 68 is mounted on the sensor body 67 in such a manner that the sensor body 67 penetrates the radiator plate 68 by passing through the radial center of the radiator plate 68. The radiator plate 68 is disposed outside the exhaust pipe 51. In the present embodiment, since the sensor 66 includes the radiator plate 68, the region of the sensor 66 that contacts the surrounding air can have an increased surface area. Thus, the sensor 66 can efficiently radiate heat to the surrounding environment through the radiator plate 68.

An imaginary region, predefined region, or simply region R1 is assumed which is an imaginary extension of the air outlet duct 15 from the outlet opening 15*a* of the air outlet duct 15 in the direction in which a portion of the air outlet duct 15 that is in the immediate vicinity of the outlet opening 15*a* extends. In FIG. 7, the region R1 is a region surrounded by the dashed-two dotted lines and the outlet opening 15*a* of the air outlet duct 15. In the present embodiment, both the joint device 55 and the sensor 66 are disposed within the imaginary region R1. Thus, air blown out of the outlet opening 15*a* of the air outlet duct 15 can be efficiently delivered not only to the joint device 55 but also to the sensor 66.

Figure 8:
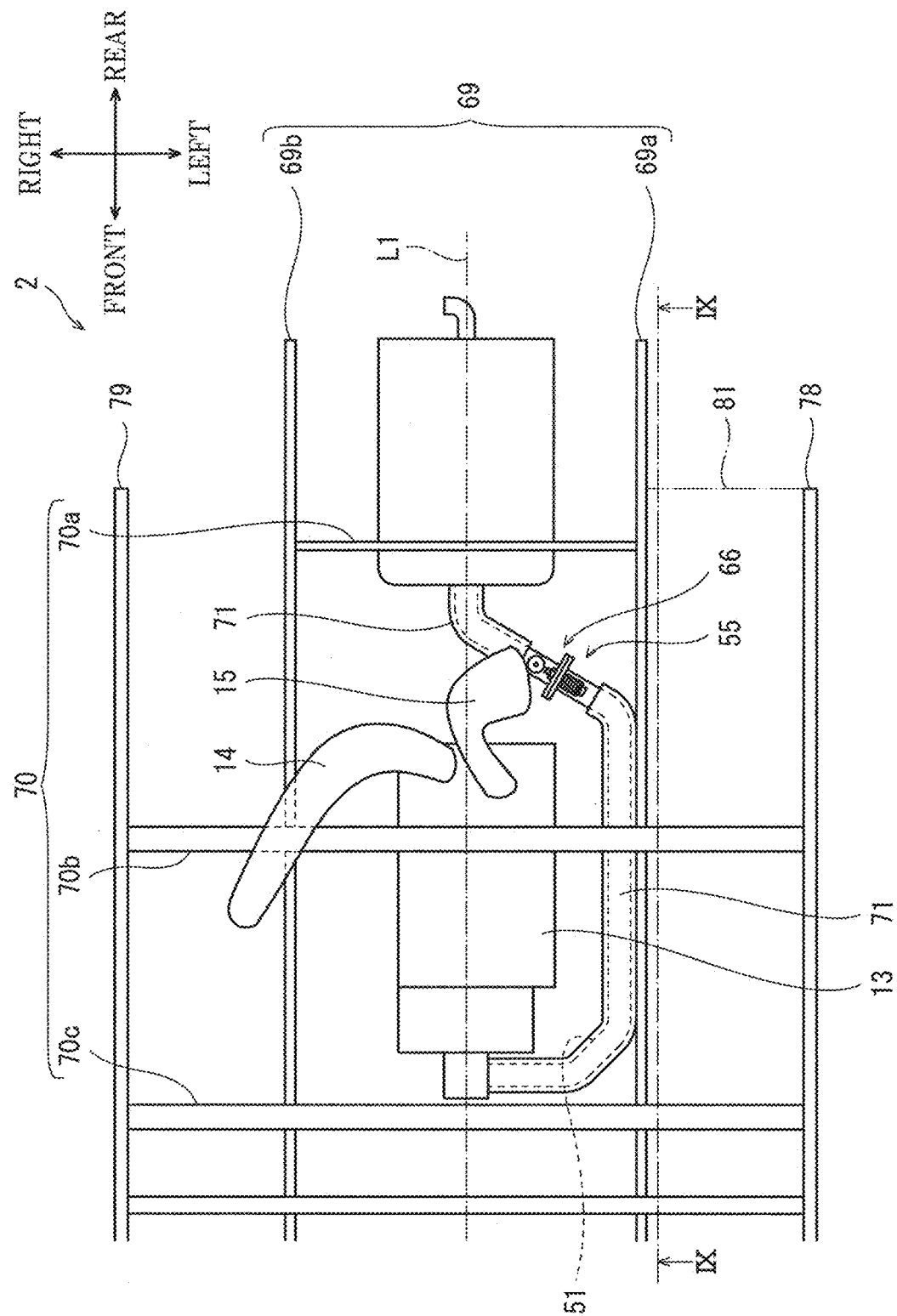
FIG. 8 is a top plan view of the engine, belt continuously variable transmission, and exhaust device which are shown in FIG. 2.

FIG. 8 is a schematic top plan view of the utility vehicle 1. In FIG. 8, for convenience of illustration, the engine 12, belt continuously variable transmission 13, exhaust device 50, and vehicle body frame 2 are shown, and the other components are omitted. The vehicle body frame 2 shown in FIG. 8 includes a plurality of front-rear direction frame portions 69 extending in the vehicle front-rear direction and a plurality of width direction frame portions 70 extending in the vehicle width direction. In the present embodiment, one of the front-rear direction frame portions 69 that is closer to the exhaust pipe 51 is referred to as a front-rear direction frame portion 69*a*, while the other front-rear direction frame which is farther from the exhaust pipe 51 is referred to as a front-rear direction frame portion 69*b*. The width direction frame portions 70 are referred to as width direction frame portions 70*a*, 70*b*, and 70*c*, respectively, as numbered from the rear to the front of the utility vehicle 1. The width direction frame portions 70*a*, 70*b*, and 70*c* are disposed as braces between the front-rear direction frame portions 69*a* and 69*b*, and thus the frame structure of the vehicle body frame 2 has an improved strength. As such, the strength of the utility vehicle 1 can be improved.

In the present embodiment, a heat shield cover 71 covering the exhaust pipe 51 is disposed radially outward of the exhaust pipe 51. Since the heat shield cover 71 covering the exhaust pipe 51 is disposed radially outward of the exhaust pipe 51, exposure of the components neighboring the exhaust pipe 51 to high temperature can be reduced when the outer circumferential surface of the exhaust pipe 51 becomes hot because of high-temperature exhaust gas flowing through the exhaust pipe 51. Thus, the components neighboring the exhaust pipe 51 can be protected from heat of the exhaust gas. In the present embodiment, the heat shield cover 71 is disposed along the direction of flow of the exhaust gas through the exhaust pipe 51, and extends over regions other than a region where the joint device 55 is mounted. As such, air blown out of the air outlet duct 15 of the belt continuously variable transmission 13 can be applied directly to the joint device 55.

In the present embodiment, the air outlet duct 15 of the belt continuously variable transmission 13 and the joint device 55, as viewed from above, are located within a region R2 which is one of the regions defined by the front-rear direction frame portions 69 and the width direction frame portions 70 (the region R2 is one defined by the front-rear direction frame portions 69*a* and 69*b* and the width direction frame portions 70*a* and 70*b*). Thus, the air outlet duct 15 of the belt continuously variable transmission 13 and the joint device 55 do not interfere with the front-rear direction frame portions 69 and width direction frame portions 70. This eliminates the need for the air outlet duct 15 and the exhaust pipe 51 to have an upward/downward bypass portion for avoiding interference of the air outlet duct 15 and the joint device 55 with the front-rear direction frame portions 69 and width direction frame portions 70. Thus, the spaces defined by the front-rear direction frame portions 69 and the width direction frame portions 70 can be efficiently used in the upward/downward direction. As such, the size of the utility vehicle 1 can be reduced.

Assuming that the air outlet duct 15 of the belt continuously variable transmission 13 and the joint device 55 are not located within any one of the regions defined by the front-rear direction frame portions 69 and the width direction frame portions 70, then interference may occur between the vehicle body frame 2 and the air outlet duct 15 or joint device 55. In the case where the air outlet duct 15 and the joint device 55 are not located within any one of the regions defined by the vehicle body frame 2 and where the air outlet duct 15 and the joint device 55 are arranged to pass above or below any of the frame portions of the vehicle body frame 2 in order that the vehicle body frame 2 may not interfere with the air outlet duct 15 or the joint device 55, the interior of the utility vehicle 1 needs to have a space having a large dimension in the vehicle height direction. This may lead to size increase of the utility vehicle 1.

In the present embodiment, the belt continuously variable transmission 13 is located toward the exhaust pipe 51 with respect to a center line L1 of the utility vehicle 1 in the vehicle width direction. The engine 12 is located approximately at the center of the vehicle in the vehicle width direction. Thus, the belt continuously variable transmission 13 and the exhaust pipe 51 are located on the same side with respect to the engine 12 in the vehicle width direction.

Figure 9:
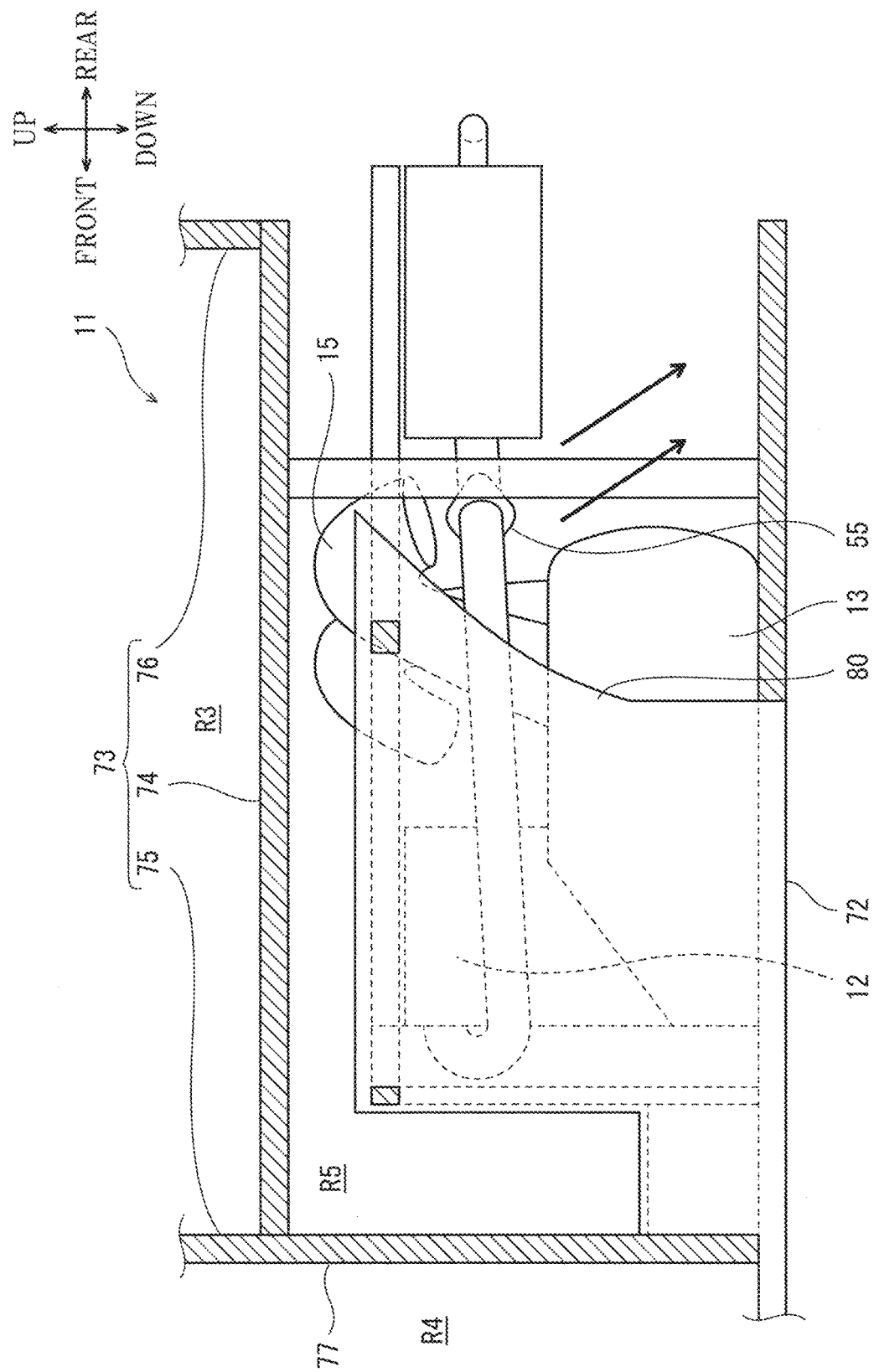
FIG. 9 is a side view of the engine, belt continuously variable transmission, and exhaust device as seen along the line IX-IX of FIG. 8.

FIG. 9 is a side view of the utility vehicle 1 as seen along the line IX-IX of FIG. 8. FIG. 9 is a side view showing the cargo bed of the utility vehicle 1 and its vicinity in the vehicle front-rear direction and showing the engine, transmission, exhaust device, and their vicinity in the vehicle width direction. The engine 12 and the belt continuously variable transmission 13 are mounted on an undercover 72 forming the bottom surface of the vehicle body of the utility vehicle 1. As stated above, the cargo bed 11 is disposed in a space above the engine 12 and the belt continuously variable transmission 13 (FIG. 1). The cargo bed 11 includes a cargo bed constituting member 73 or cargo bed components 73. The cargo bed constituting member 73 includes a bottom member or bottom 74 forming the bottom of the cargo bed 11, a front member or front 75 defining the front edge of the cargo bed 11, and a rear member or rear 76 defining the rear edge of the cargo bed 11. The region surrounded by the cargo bed constituting member 73 is a space in which goods are accommodated, and this space is referred to as a cargo bed space R3 of the cargo bed 11. The engine 12 and the belt continuously variable transmission 13 are mounted beneath the cargo bed space R3.

The space in which the driver seat 6 and the passenger seat 7 are disposed is referred to as a seat space R4. The space in which the engine 12 and the belt continuously variable transmission 13 are disposed is referred to as an engine region R5. The seat space R4 and the engine region R5 are divided from each other by a partition wall. The cargo bed space R3 and the seat space R4 are divided from each other by a wall 77. The front member 75 (front wall) of the cargo bed constituting member 73 is configured as a part of the wall 77. The engine 12 and the belt continuously variable transmission 13 are surrounded by lateral walls 78 and 79 on both sides in the vehicle width direction (FIG. 8). The lateral walls 78 and 79 function as walls which protect both lateral sides of the vehicle body of the utility vehicle 1. Thus, the engine 12 and the belt continuously variable transmission 13 are surrounded on both sides in the vehicle width direction, both sides in the vehicle height direction, and the front side in the vehicle front-rear direction by a dividing wall constituted by the lateral walls 78 and 79, the undercover 72, the bottom member 74 of the cargo bed constituting member 73, and the wall 77. In the present embodiment, the engine 12 and the belt continuously variable transmission 13 are surrounded in part also by an engine cover 80 on the upper and lateral sides.

As shown in FIGS. 8 and 9, air blown out of the outlet opening 15*a* of the air outlet duct 15 passes by the joint device 55 and flows rearwardly. As shown in FIG. 8, the utility vehicle 1 includes a discharge opening 81 which is disposed between the lateral wall 78 and the front-rear direction frame portion 69*a* and through which the air fed from the outlet opening 15*a* of the air outlet duct 15 is discharged out of the utility vehicle 1. The discharge opening 81 is located rearwardly of the joint device 55 in the vehicle front-rear direction. The discharge opening 81 faces rearwardly.

In the above embodiment, the joint device 55 permits the upstream and downstream pipes 53 and 54 of the exhaust pipe 51 to move relative to each other when the exhaust pipe 51 is exposed to an impact arising from travel on an uneven terrain and vibration of the engine 12. This can prevent stress concentration on the point where the exhaust pipe 51 is supported. Additionally, cooling air blown out of the air outlet duct 15 of the belt continuously variable transmission 13 is delivered toward the joint device 55 to cool the joint device 55. Thus, the joint device 55 can be prevented from becoming hot. As such, the decrease in durability of the joint device 55 due to temperature increase can be reduced. Consequently, the durability of the exhaust device 50 can be improved.

It is particularly preferable to cool the elastic element 58 of the joint device 55. In the present embodiment, the elastic element 58 is a spring. Since cooling air is blown out of the air outlet duct 15 of the belt continuously variable transmission 13 toward the elastic element 58, the elastic element 58 can be efficiently cooled. Thus, the thermal deterioration of the elastic element 58 can be reduced, and the durability of the joint device 55 can be improved. Consequently, the durability of the exhaust device 50 can be improved. Additionally, for example, since the elastic element 58 can be formed from an inexpensive material having relatively low heat resistance, the manufacturing cost of the joint device 55 can be reduced.

In the present embodiment, the joint device 55 includes two elastic elements 58 and two elastic element holding members or elastic holders 59. The two pairs of elastic element 58 and elastic element holding member 59 are arranged in a direction crossing the air blowing direction in which air is blown out of the outlet opening 15*a* of the air outlet duct 15 toward the joint device 55. Thus, when the joint device 55 is viewed in the air blowing direction, one of the two pairs of elastic element 58 and elastic element holding member 59 is not hidden by the other pair. As such, cooling air blown out of the air outlet duct 15 directly contacts both of the two pairs of elastic element 58 and elastic element holding member 59. Consequently, the two pairs of elastic element 58 and elastic element holding member 59 can be efficiently cooled. As in the present embodiment, the joint device 55 may include a plurality of pairs of the elastic element 58 and the elastic element holding member 59. In this case, the pairs of elastic element 58 and elastic element holding member 59 are preferably arranged in a direction crossing the air blowing direction in which air is blown out of the air outlet duct 15. This allows cooling air to directly contact each pair of the elastic element 58 and elastic element holding member 59 and thereby allows each pair of the elastic element 58 and elastic element holding member 59 to be cooled efficiently.

In the present embodiment, cooling air is blown toward the joint device 55 by rotation of the impeller 33*a* (rotary member, rotary blower, or fan) rotationally driven by power of the engine 12; that is, cooling air can be blown toward the joint device 55 by rotational drive power of the engine 12. As such, the structure for cooling the joint device 55 can be simplified.

In the present embodiment, the belt continuously variable transmission 13 not only cools the joint device 55 by blowing air out of the air outlet duct 15 but also cools its belt 26 by means of the air to be blown out of the air outlet duct 15. Thus, one and the same component can be used both as an air blowing device for cooling the joint device 55 and as an air blowing device for cooling the belt 26. As such, the configuration of the exhaust device 50 can be simplified.

In the present embodiment, since cooling air blown out of the air outlet duct 15 is delivered toward the sensor 66 as well as toward the joint device 55, the sensor 66 is also cooled by the cooling air. Thus, the sensor 66 can be prevented from becoming hot. As such, the sensor 66 as well as the joint device 55 can be protected from a high-temperature environment.

In the present embodiment, the exhaust device 50 is incorporated in the utility vehicle 1 configured as a vehicle for travel on uneven terrains; that is, the utility vehicle 1 incorporating the exhaust device 50 with high durability can be provided.

In the present embodiment, the engine 12 is surrounded on both sides in the vehicle width direction, both sides in the vehicle height direction, and the front side in the vehicle front-rear direction by the lateral walls 78 and 79, undercover 72, bottom member 74, and wall 77. This can reduce transfer of heat generated in the engine 12 to the outside of the space defined by the lateral walls 78 and 79, undercover 72, bottom member 74, and wall 77. As such, the increase in the temperature outside the space in which the engine 12 is disposed can be reduced. Even in the case where the exhaust pipe 51 is disposed in the space defined by the lateral walls 78 and 79, undercover 72, bottom member 74, and wall 77 and where the temperature of the exhaust pipe 51 is likely to increase, the joint device 55 can be prevented from becoming hot because the joint device 55 is cooled by the air blowing device. Consequently, the durability of the joint device 55 and therefore the durability of the exhaust device 50 can be improved.

In the present embodiment, the engine 12 is disposed below the cargo bed 11 and rearwardly of the driver seat 6 on which the driver sits, and the engine 12 is surrounded by the lateral walls 78 and 79 of the vehicle, the undercover 72, and the wall 77 dividing the seat space R4 from the cargo bed space R3. Thus, the dividing wall surrounding the engine 12 to prevent heat of the exhaust pipe 51 from being transferred to the neighboring components includes at least one selected from: at least a part of the lateral walls of the vehicle; at least a part of the cargo bed; and at least a part of the front wall dividing the seat space from the cargo bed space. As such, the structure for surrounding the engine 12 can be simplified.

In the present embodiment, since the discharge opening 81, through which the cooling air having cooled the joint device 55 is discharged, is disposed rearwardly of the joint device 55 and faces rearwardly, foreign matter entering the vehicle through the discharge opening 81 during travel is unlikely to be directed toward the joint device 55. This can prevent the durability of the joint device 55 from deteriorating due to contact of foreign matter with the joint device 55.

In the present embodiment, the heat shield cover 71 is disposed along the direction of flow of the exhaust gas through the exhaust pipe 51, and extends over regions other than a region where the joint device 55 is mounted. Thus, the radially outer side of the exhaust pipe 51, except for the region where the joint device 55 is mounted, is covered by the heat shield cover 71. As such, the components neighboring the exhaust pipe 51 can be protected from heat generated by the engine 12. Additionally, since the joint device 55 is not covered by the heat shield cover 71, the joint device 55 can be efficiently cooled by cooling air blown out of the air outlet duct 15.

In the present embodiment, the belt continuously variable transmission 13 and the exhaust pipe 51 are located on the same side with respect to the engine 12 in the vehicle width direction, and the heat shield cover 71 covering the exhaust pipe 51 is disposed radially outward of the exhaust pipe 51. Thus, while the joint device 55 and the outlet opening 15*a* of the air outlet duct 15 are disposed close to each other, the belt continuously variable transmission 13 can be protected by the heat shield cover 71 to prevent the cover 32 of the belt continuously variable transmission 13 from being exposed to high temperature due to heat transferred from the exhaust pipe 51. As such, the cover 32 as well as the joint device 55 can be protected from heat, and the durability of both the joint device 55 and the belt continuously variable transmission 13 can be improved.

In the present embodiment, the belt continuously variable transmission 13 and the exhaust pipe 51 are located on the same side with respect to the engine 12 in the vehicle width direction, and cooling air can be blown in such a manner as to cool both the joint device 55 and the belt 26 (FIG. 4) of the belt continuously variable transmission 13. Thus, both the joint device 55 and the belt 26 can be efficiently cooled.

Embodiment 2

Hereinafter, a utility vehicle according to Embodiment 2 will be described. The elements configured in the same manner as in Embodiment 1 will not be repeatedly described, and only the elements distinguishing Embodiment 2 from Embodiment 1 will be described. In Embodiment 1 described above, the sensor 66 is disposed downstream of, and relatively far from, the joint device 55 in the direction of flow of exhaust gas through the exhaust pipe (FIGS. 2 and 7). Embodiment 2 differs from Embodiment 1 in that a part of the sensor is at the same location as a part of the joint device in the direction of flow of exhaust gas through the exhaust pipe.

FIG. 10 is a plan view showing key components of a utility vehicle 1*a* of Embodiment 2. As shown in FIG. 10, the utility vehicle 1*a* includes an exhaust device 50*a*, and the exhaust device 50*a* includes an exhaust pipe 51*b* and an exhaust muffler 52*a*. The exhaust pipe 51*b* includes an upstream pipe 53*a*, a downstream pipe 54*a*, and a joint device 55*a*. The exhaust pipe 51*b* is equipped with a sensor 66*a*. The sensor 66*a* includes a circular cylindrical sensor body 67*a*, a disc-shaped radiator plate 68*a*, and a detection portion for detecting features of the exhaust.

The utility vehicle 1*a* includes an air outlet duct 15*b*. Cooling air can be blown out of an outlet opening of the air outlet duct 15*b*. The outlet opening of the air outlet duct 15*b* faces toward the joint device 55*a* and the sensor 66*a*, and the joint device 55*a* and the sensor 66*a* can be cooled by cooling air blown out of the air outlet duct 15*b*. When the utility vehicle 1*a* is viewed in plan, the air outlet duct 15*b* is at a different location than the exhaust pipe 51*b*.

A heat shield cover 71*a* covering the upstream pipe 53*a* is disposed radially outward of the upstream pipe 53*a*. The heat shield cover 71*a* is not disposed around the downstream pipe 54*a*. In the present embodiment, the joint device 55*a* and the sensor 66*a* are disposed close to the exhaust muffler 52*a* in the direction of flow of the exhaust gas through the exhaust pipe 51*b*. Thus, the downstream pipe 54*a* is short in the direction of flow of the exhaust gas. Even if the heat shield cover 71*a* is disposed around the downstream pipe 54*a*, this does not bring a significant effect. For this reason, the heat shield cover 71*a* is not disposed around the downstream pipe 54*a*, but disposed only around the upstream pipe 53*a*.

The joint device 55*a* includes a first flange 56*c*, a second flange 57*c*, and an elastic element 58*a*. The elastic element 58*a* elastically biases the first and second flanges 56*c* and 57*c* in such a direction that the first and second flanges 56*c* and 57c are close to each other. In the present embodiment, two such elastic elements 58a are provided. The sensor 66a is disposed upstream of the first and second flanges 56c and 57c in the direction of flow of the exhaust gas through the exhaust pipe 51b, and is closer to the joint device 55a than the sensor 66 is to the joint device 55 in Embodiment 1. In particular, a part of the sensor 66a is at the same location as the elastic element 58a of the joint device 55a in the direction of flow of the exhaust gas through the exhaust pipe 51b.

In the configuration of Embodiment 2, since the sensor 66a is disposed close to the joint device 55a in the direction of flow of the exhaust gas through the exhaust pipe 51b, cooling air blown out of the air outlet duct 15b can be delivered toward the sensor 66a and the joint device 55a to cool both the sensor 66a and the joint device 55a within a relatively narrow air-blown region. Thus, both the sensor 66a and the joint device 55a can be efficiently cooled. The high efficiency of cooling makes it possible to cool both the sensor 66a and the joint device 55a sufficiently with a small amount of air blown out of the air outlet duct 15b, thus permitting size reduction of the air blowing device (e.g., the belt continuously variable transmission) that blows air. This can result in reduction in size and manufacturing cost of the utility vehicle 1a.

In the present embodiment, the elastic elements 58a and the sensor 66a are disposed upstream of the first and second flanges 56c and 57c. That is, the outlet opening of the air outlet duct 15b, the elastic elements 58a, and the sensor 66a are disposed on the same side with respect to the first and second flanges 56c and 57c. Thus, when cooling air is blown out of the air outlet duct 15b toward the sensor 66a, the first and second flanges 56c and 57c do not obstruct the flow of cooling air. Additionally, when air is to be blown toward the elastic elements 58a of the joint device 55a to cool the elastic elements 58a, the first and second flanges 56c and 57c do not obstruct the flow of air toward the elastic elements 58a. When the elastic elements 58a and the sensor 66a are to be cooled, the cooling of the elastic elements 58a and the sensor 66a can be accomplished with improved efficiency. Thus, further size reduction of the air blowing device can be achieved, so that the size and manufacturing cost of the utility vehicle 1a can be further reduced.

Since the joint device 55a and the sensor 66a are disposed close to the exhaust muffler 52a in the direction of flow of the exhaust gas through the exhaust pipe 51b, the distance between the exhaust muffler 52a and the joint device 55a is small. Thus, when cooling air is blown toward the joint device 55a to cool the joint device 55a, the cooling air is delivered in a direction toward the exhaust muffler 52a, and the cooling air having passed through the elastic elements 58a and the sensor 66a collides with the exhaust muffler 52a and is turned back toward the elastic elements 58a and the sensor 66a, so that the elastic elements 58a and the sensor 66a can be cooled by the cooling air again. As such, the elastic elements 58a and the sensor 66a can be cooled with improved efficiency, and the size of the air blowing device can be further reduced.

In the present embodiment, since the heat shield cover 71a is not disposed radially outward of the downstream pipe 54a, but only disposed radially outward of the upstream pipe 53a, the heat shield cover required is only the heat shield cover 71a disposed radially outward of the upstream pipe 53a. Thus, there is no need to provide a heat shield cover for the upstream pipe 53a and a heat shield cover for the downstream pipe 54a separately, and the structure of the heat shield cover 71a is simplified. This can make easier the manufacturing process of the utility vehicle 1a and lead to reduction in manufacturing cost of the utility vehicle 1a.

In the present embodiment, when the utility vehicle 1a is viewed in plan, the air outlet duct 15b is at a different location than the exhaust pipe 51b. This can prevent a situation where heated air around the hot exhaust pipe 51b moves upwardly from the exhaust pipe 51b to increases the temperature of the air outlet duct 15b.

In the present embodiment, the sensor 66a is located between the two elastic elements 58a and positioned perpendicular to the exhaust pipe 51b; that is, the sensor 66a is disposed in a position where the major surface of the radiator plate 68a of the sensor 66a is approximately perpendicular to the direction in which cooling air blown out of the outlet opening of the air outlet duct 15b is delivered. Thus, an increased amount of cooling air is applied to the radiator plate 68a, and the radiator plate 68a can be cooled with improved efficiency. Additionally, the radiator plate 68a can guide the cooling air toward one of the two elastic elements 58a of the joint device 55a that is farther from the air outlet duct 15b. As such, the elastic element 58a farther from the air outlet duct 15b can be cooled with improved efficiency.

OTHER EMBODIMENTS

While in the above embodiments the exhaust device is configured such that cooling air blown out of the air outlet duct cools both the joint device and the sensor, the exhaust device is not limited to this configuration of the above embodiments. The cooling air blown out of the air outlet duct need not necessarily cool the sensor. It is sufficient that the joint device be cooled by cooling air blown out of the air outlet duct. While in the above embodiments the exhaust device described is configured such that cooling air blown out of the air outlet duct is delivered toward the elastic elements, the exhaust device is not limited to this configuration of the above embodiments. The cooling air blown out of the air outlet duct may be delivered toward a component of the joint device which is other than the elastic elements. It is sufficient that the cooling air blown out of the air outlet duct be delivered toward at least a part of the joint device. While in Embodiment 1 the exhaust device described is configured such that both the joint device 55 and the air outlet duct 15 are located within the imaginary region R1 which is an imaginary extension of the air outlet duct 15 from the outlet opening 15a of the air outlet duct 15 in the direction in which a portion of the air outlet duct 15 that is in the immediate vicinity of the outlet opening 15a extends, the exhaust device is not limited to this configuration of Embodiment 1. The sensor need not necessarily be located within the imaginary region R1. The joint device need not necessarily be located within the imaginary region R1 insofar as the joint device is cooled by cooling air blown out of the air outlet duct. It is sufficient that the joint device be cooled by air blown out of the air outlet duct toward the joint device.

While in the above embodiments the exhaust device is configured such that cooling air blown out of the air outlet duct is applied directly to the joint device, the exhaust device is not limited to this configuration of the above embodiments. The cooling air may be blown out of the air outlet duct such that the cooling air is applied to another component neighboring the joint device and that the other component is cooled by the cooling air and consequently the temperature of the joint device is decreased. Even such a case is considered herein one of the cases where cooling air is delivered toward the joint device.

While in the above embodiments the exhaust device described is configured such that cooling air is blown out of the air outlet duct of the belt continuously variable transmission, the exhaust device is not limited to this configuration of the above embodiments. The cooling air may be blown out of another component. For example, cooling air may be blown by an air blowing device configured separately from the engine and the belt continuously variable transmission. In this case, the air blowing device need not be configured to blow cooling air by rotation of a rotary member rotationally driven by power of a prime mover such as the engine. The air blowing device may, for example, include a battery and be configured to blow cooling air by itself. Alternatively, an air outlet duct may be provided to a form of transmission other than a belt continuously variable transmission, and cooling air may be blown out of the air outlet duct. For example, a form of transmission may be employed in which the reduction ratio between an input shaft and an output shaft is adjusted by selecting a gear pair with a desired gear ratio from a plurality of gear pairs having different gear ratios and by bringing the gears of the selected pair into mesh, and an impeller may be mounted on any rotating portion of the transmission and rotated to blow cooling air.

What is claimed is:

1. An exhaust device for use with a vehicle for travel on uneven terrains, comprising:
   an air blower; and
   an exhaust pipe through which exhaust gas generated in a prime mover passes, the exhaust pipe includes an upstream pipe, a downstream pipe, and a joint movably joining the upstream pipe to the downstream pipe,
   the air blower being disposed to deliver cooling air at least to an exterior of the joint.

2. The exhaust device according to claim 1, wherein:
   the exhaust pipe includes a sensor to sense the exhaust gas flowing through the exhaust pipe,
   the air blower includes an air outlet duct through which cooling air is blown toward the joint, and
   both the sensor and the joint are located within a region which is an imaginary extension of the air outlet duct from an outlet opening of the air outlet duct in a direction in which a portion of the air outlet duct that is in an immediate vicinity of the outlet opening extends.

3. The exhaust device according to claim 1, wherein the air blower includes an outlet opening located above the joint and facing downwardly.

4. The exhaust device according to claim 1, wherein the joint comprises:
   a first flange attached to an end of the upstream pipe, the end of the upstream pipe facing the downstream pipe;
   a second flange attached to an end of the downstream pipe, the end of the downstream pipe facing the upstream pipe;
   at least one elastic element biasing the first flange and the second flange towards each other; and
   a slide in pressured contact between the first and second flanges, the slide having an outer surface with a curved portion that contacts an inner side of at least one of the first flange and the second flange, and
   wherein the air blower is disposed to blow cooling air toward the elastic element.

5. The exhaust device according to claim 1, wherein:
   the air blower comprises an outlet opening and an air outlet duct through which cooling air is directed to the outlet opening,
   an imaginary region is located forward of the outlet opening, the imaginary region being an imaginary extension of the air outlet duct from the outlet opening in a direction in which a portion of the air outlet duct that is in an immediate vicinity of the outlet opening extends, and
   the joint is located within the imaginary region.

6. The exhaust device according to claim 1, wherein:
   the joint comprises an elastic element urging the upstream pipe and the downstream pipe towards each other, and
   the air blower blows cooling air at least toward the elastic element.

7. The exhaust device according to claim 6, wherein:
   the joint comprises two elastic elements urging the upstream pipe and the downstream pipe towards each other, and
   the two elastic elements are arranged in a direction crossing an air blowing direction in which the air blower blows cooling air.

8. The exhaust device according to claim 1, wherein:
   the air blower comprises a rotary blower rotationally driven by power of the prime mover, and delivers cooling air to an exterior of the joint by rotation of the rotary blower.

9. The exhaust device according to claim 8, further comprising:
   a belt continuously variable transmission that changes a speed of rotation produced by drive power output from the prime mover, the belt continuously variable transmission comprising a drive pulley, a driven pulley, a belt wound around the drive pulley and the driven pulley, and a housing including an accommodation space in which the belt is disposed,
   wherein:
   the rotary blower includes a fan connected to a rotational shaft of the drive pulley or a rotational shaft of the driven pulley, and
   the air blower blows cooling air by the fan rotating in conjunction with rotation of the drive pulley or the driven pulley.

10. The exhaust device according to claim 9, wherein the air blower cools the belt as well as the joint.

11. A vehicle for travel on uneven terrains, comprising an exhaust device, the exhaust device comprising:
    an air blower; and
    an exhaust pipe through which exhaust gas generated in a prime mover is directed out of the vehicle,
    the exhaust pipe comprising an upstream pipe, a downstream pipe, and a joint movably joining the upstream pipe to the downstream pipe,
    the air blower being disposed to deliver cooling air to an exterior of the joint.

12. The vehicle for travel on uneven terrains according to claim 11, wherein the joint comprises:
    a first flange attached to an end of the upstream pipe, the end facing the downstream pipe; and
    a second flange attached to an end of the downstream pipe, the end facing the upstream pipe,
    wherein the exhaust pipe comprises a width direction extending portion extending substantially in a vehicle width direction, and
    wherein the first and second flanges of the joint device are coupled at the width direction extending portion to join the upstream pipe to the downstream pipe.

13. The vehicle for travel on uneven terrains according to claim 11, wherein the joint is located rearwardly of the prime mover in a vehicle front-rear direction.

14. The vehicle for travel on uneven terrains according to claim 11, further comprising:
a belt continuously variable transmission that uses a belt wound around a drive pulley and a driven pulley to change a speed of rotation produced by drive power output from the prime mover,
wherein:
the belt continuously variable transmission and the exhaust pipe are located on the same side with respect to the prime mover in a vehicle width direction, when the vehicle is viewed from above,
the exhaust pipe is located closer to the belt continuously variable transmission than to the prime mover, and
the air blower blows cooling air to cool both the joint and the belt.

15. The vehicle for travel on uneven terrains according to claim 11, further comprising:
a dividing wall surrounding the prime mover on both sides in a vehicle width direction, both sides in a vehicle height direction, and a front side in a vehicle front-rear direction.

16. The vehicle for travel on uneven terrains according to claim 15, further comprising:
a discharge opening through which cooling air blown out of the air blower is discharged to an external space,
wherein the discharge opening is located rearwardly of the joint.

17. The vehicle for travel on uneven terrains according to claim 15, further comprising a heat shield cover covering a radially outer side of the exhaust pipe,
wherein the heat shield cover is disposed along a direction of flow of the exhaust gas through the exhaust pipe, and extends over regions other than a region where the joint is mounted.

18. The vehicle for travel on uneven terrains according to claim 17, further comprising:
a belt continuously variable transmission that changes a speed of rotation produced by drive power output from the prime mover, the belt continuously variable transmission comprising a transmission cover,
wherein:
the belt continuously variable transmission and the exhaust pipe are located on the same side with respect to the prime mover in the vehicle width direction, when the vehicle is viewed from above,
the joint is located rearwardly of the transmission cover, and
the exhaust pipe has a portion adjacent to the transmission cover, the portion being covered by the heat shield cover.

19. A vehicle for travel on uneven terrains, comprising:
an exhaust device;
a prime mover; and
a dividing wall surrounding the prime mover on both sides in a vehicle width direction, both sides in a vehicle height direction, and a front side in a vehicle front-rear direction,
wherein:
the exhaust device comprises an air blower and an exhaust pipe through which exhaust gas generated in the prime mover is directed out of the vehicle;
the exhaust pipe comprises an upstream pipe, a downstream pipe, and a joint movably joining the upstream pipe to the downstream pipe;
the air blower is disposed to blow cooling air toward the joint;
the prime mover is disposed below a cargo bed and rearwardly of a seat on which a driver sits; and
the dividing wall comprises at least one selected from: at least a part of lateral walls of the vehicle; at least a part of the cargo bed; and at least a part of a front wall dividing a seat space from a cargo bed space.

* * * * *